(12) United States Patent
Yoshihara et al.

(10) Patent No.: US 7,023,690 B2
(45) Date of Patent: Apr. 4, 2006

(54) CAPACITOR

(75) Inventors: Yumiko Yoshihara, Tokyo (JP);
Masaaki Kobayashi, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 11/015,416

(22) Filed: Dec. 20, 2004

(65) Prior Publication Data

US 2005/0201042 A1 Sep. 15, 2005

(30) Foreign Application Priority Data

Dec. 26, 2003 (JP) .......................... P2003-433664

(51) Int. Cl.
*H01G 4/228* (2006.01)
*H01G 9/10* (2006.01)

(52) U.S. Cl. .................... 361/533; 361/540; 361/520

(58) Field of Classification Search ........ 361/508–509, 361/520, 528, 532–533, 538–540
See application file for complete search history.

(56) References Cited

U.S. PATENT DOCUMENTS

2005/0013093 A1* 1/2005 Nagasawa et al. .......... 361/508

FOREIGN PATENT DOCUMENTS

| JP | A 2001-102252 | | 4/2001 |
| JP | 2002-134362 | * | 5/2002 |
| JP | 2001-257130 | * | 9/2005 |

* cited by examiner

*Primary Examiner*—Eric W. Thomas
(74) *Attorney, Agent, or Firm*—Oliff & Berridge, PLC

(57) ABSTRACT

A capacitor enlarging an anode electrode pattern of a substrate is provided. The capacitor comprises a capacitor device including anode and cathode parts; and a substrate including a device mounting surface formed with anode and cathode electrode patterns connected to the anode and cathode parts, respectively, and a rear face formed with anode and cathode land patterns connected to the anode and cathode electrode patterns corresponding thereto by way of anode and cathode vias extending along a thickness direction. The anode electrode pattern is integrally formed with a region including at least a part of a region corresponding to the anode land pattern and at least a part of a region corresponding to the cathode land pattern in an area of the device mounting surface of the substrate.

6 Claims, 6 Drawing Sheets (a)

(b)

(a)

(b)

CAPACITOR

BACKGROUND OF THE INVENTION

1. Field of the Invention

The present invention relates to a capacitor.

2. Related Background Art

In general, capacitor devices used in capacitors such as electrolytic capacitor are made by the steps of using a metal such as aluminum, titanium, or tantalum (so-called valve metal) having a capability of forming an insulating oxidized film as an anode; anode-oxidizing a surface of the valve metal, so as to form an insulating oxidized film; thereafter forming a solid electrolyte layer made of an organic compound or the like substantially functioning as a cathode; and further providing a conductive layer such as graphite or silver as a cathode.

Known as methods of lowering the impedance of such capacitors include those lowering equivalent series inductance (ESL) and equivalent series resistance (ESR). Japanese Patent Application Laid-Open No. 2001-102252 discloses a capacitor which omits a lead frame in order to reduce the ESR. The capacitor disclosed in the above-mentioned publication is one including a substrate having a device mounting surface on which a double terminal type capacitor device having a pair of electrodes is mounted, whereas the electrodes on the device mounting surface of the substrate are connected to electrodes on the rear face thereof via through holes.

Here, a mounting substrate on which the capacitor is mounted is provided with two kinds of terminals, i.e., anode and cathode electrode terminals. When the capacitor is of multiterminal type, the anode and cathode electrode terminals are arranged in a row while alternating with each other in general. Therefore, anode and cathode outer connecting terminals corresponding to the anode and cathode electrode terminals, respectively, are arranged in a row while alternating with each other on the surface of the substrate opposite from the device mounting surface. When the above-mentioned through holes are simply employed in this substrate, anode electrode patterns connected to the anode outer connecting terminals by way of the through holes and cathode electrode patterns connected to the cathode outer connecting terminals by way of the through holes are arranged in a row while alternating with each other on the device mounting surface of the substrate, whereas their row is oriented in the same direction as with the row of the anode and cathode outer connecting terminals on the opposite surface.

The workability at the time of connecting anode parts of capacitor devices improves as the area of anode electrode patterns formed on the device mounting surface of the substrate increases. Also, the area usable for connecting with the anode parts of capacitor devices can be increased, whereby the connecting strength can be improved.

However, the above-mentioned conventional capacitor device has been problematic in that it does not sufficiently improve the workability at the time of connecting capacitor devices to the substrate and the connecting strength therebetween, since the anode electrode patterns are small.

Therefore, in order to overcome the problem mentioned above, it is an object of the present invention to provide a capacitor in which anode electrode patterns of the substrate are enlarged.

SUMMARY OF THE INVENTION

The inventor conducted studies concerning techniques in which through holes are employed in capacitors, and contemplated an eight-terminal capacitor including a substrate shown in FIG. 6. FIG. 6 is a view showing a device mounting surface 114a and its rear face 114b in a substrate 114 under study, in which (a) part is a view showing the device mounting surface 114 of the substrate 114 under study, whereas (b) part is a view showing the rear face 114b of the device mounting surface 114a of the substrate 114 under study. The device mounting surface 114a is formed with anode electrode patterns 138A and a cathode electrode pattern 138B respectively connected to anode and cathode parts of capacitor devices which are not depicted, whereas the rear face 114b is formed with anode land patterns 140A and cathode land patterns 140B. Here, numeral 144 refers to anode vias connecting the anode electrode patterns 138A to the anode land patterns 140A, whereas numeral 148 refers to cathode vias connecting the cathode electrode pattern 138B and the cathode land patterns 140B to each other.

In the capacitor shown in FIG. 6, the anode electrode patterns 138A on the device mounting surface 114a of the substrate 114 are formed at regions substantially corresponding to their corresponding anode land patterns 140A on the rear face 114b and have substantially the same areas as those of the latter. Consequently, the anode electrode patterns 138A have small areas, so that, when mounting capacitor devices onto the substrate 114, there have been cases where operations of connecting anode parts of the capacitor devices to the anode electrode patterns 138A of the substrate 114 become difficult, and where a sufficient connecting strength cannot be attained.

Therefore, in one aspect, the present invention provides a capacitor comprising a capacitor device including anode and cathode parts; and a substrate including one face formed with anode and cathode electrode patterns connected to the anode and cathode parts, respectively, and the other face formed with anode and cathode land patterns connected to the anode and cathode electrode patterns corresponding thereto by way of conduction paths extending along a thickness direction; wherein the anode electrode pattern is integrally formed with a region including at least a part of a region corresponding to the anode land pattern and at least a part of a region corresponding to the cathode land pattern in an area of the one face of the substrate.

In this capacitor, the region formed with the anode electrode pattern in the substrate connected to the anode part includes not only at least a part of the region corresponding to the anode land pattern, but also at least a part of the region corresponding to the cathode land pattern. Therefore, this capacitor can yield a larger electrode pattern area as compared with a capacitor including a substrate (see FIG. 6) on which an anode electrode pattern having substantially the same area as with the anode land pattern is formed at a region corresponding to the anode land pattern.

Preferably, respective outer connecting terminal parts of the anode and cathode land patterns connected to connecting terminals of a mounting substrate are arranged in a row while alternating with each other. In this case, the capacitor can easily be applied to universal substrates.

In another aspect, the present invention provides a capacitor comprising a capacitor device including a plurality of anode parts and a cathode part; and a substrate including one face formed with a plurality of anode electrode patterns connected to the respective anode parts and a cathode electrode pattern connected to the cathode part, and a plurality of conduction paths respectively extending from the anode electrode patterns and cathode electrode pattern formed on the one face to the other face along a thickness direction; wherein a plurality of the anode electrode patterns are arranged in a row on at least one side of the cathode electrode pattern with no cathode electrode pattern formed in a region held between the anode electrode patterns arranged in a row.

In this capacitor, one face of the substrate is formed with a plurality of anode electrode patterns arranged in a row. The plurality of anode electrode patterns are arranged in a row such that no cathode electrode pattern is held therebetween. As a consequence, this capacitor can significantly increase the area of anode electrode patterns in the direction of their row as compared with a capacitor including a substrate in which anode and cathode electrode patterns are arranged in a row while alternating with each other (see FIG. 6).

Preferably, the other face of the substrate is formed with an anode land pattern connected to the anode electrode pattern by way of the conduction path and a cathode land pattern connected to the cathode electrode pattern by way of the conduction path, whereas respective outer connecting terminal parts of the anode and cathode land patterns connected to connecting terminals of a mounting substrate are arranged in a row while alternating with each other. In this case, the capacitor can easily be applied to universal substrates.

Preferably, a region formed with the anode electrode pattern is provided with a plurality of conduction paths arranged in an arranging direction of the anode and cathode land patterns, whereas a region formed with the cathode electrode pattern is provided with a plurality of conduction paths adjacent to the conduction paths formed in the anode electrode pattern. This can significantly reduce the ESL of the capacitor.

As explained in the foregoing, the present invention can enlarge anode electrode patterns on the substrate of the capacitor.

DESCRIPTION OF THE PREFERRED EMBODIMENTS

In the following, embodiments considered to be the most favorable when carrying out the present invention will be explained in detail with reference to the accompanying drawings. Constituents identical or equivalent to each other will be referred to with numerals identical to each other without repeating their overlapping descriptions if any.

Figure 1:
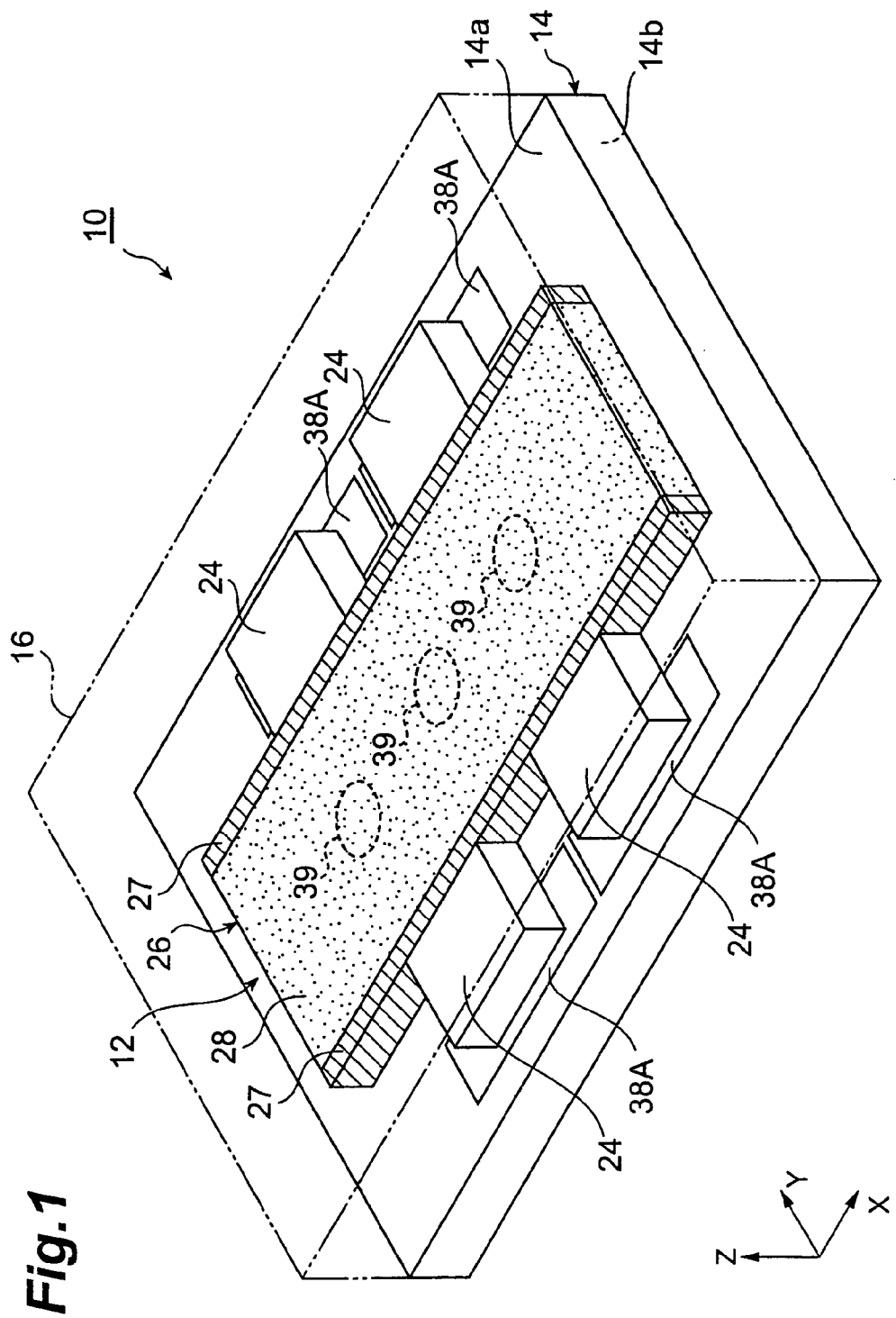
FIG. 1 is a perspective view showing the capacitor in accordance with an embodiment of the present invention.

FIG. 1 is a perspective view showing the electrolytic capacitor in accordance with an embodiment of the present invention. As shown in FIG. 1, this electrolytic capacitor 10 comprises a capacitor device 12, a substrate 14 formed like a quadrangular thin strip for mounting the capacitor device 12, and a resin mold 16 for molding the capacitor device 12 and substrate 14.

The capacitor device 12 is one in which a solid polymer electrolyte layer and a conductor layer are successively laminated at a partial region (which will be explained later) on a foil-like aluminum support (valve metal support) whose surface is roughened (increased) and subjected to chemical processing.

Figure 2:
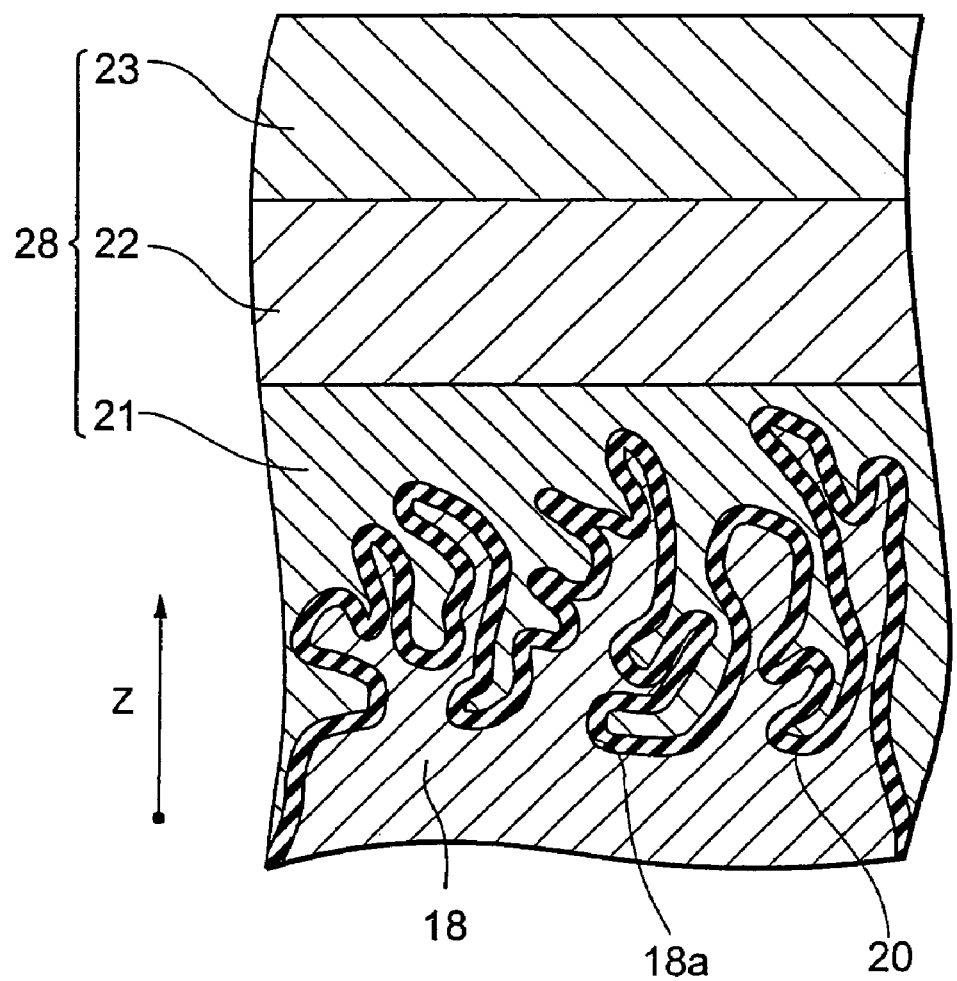
FIG. 2 is a schematic sectional view showing a major part of the capacitor shown in FIG. 1.

The laminate structure will now be explained more specifically with reference to FIG. 2. FIG. 2 is a schematic sectional view showing a major part of the electrolytic capacitor 10 shown in FIG. 1.

As shown in FIG. 2, the aluminum support 18 roughened by etching has a surface 18a formed with an insulating aluminum oxide film 20, which functions as a dielectric, by chemical processing, i.e., anode oxidization. Depressions of the aluminum support 18 having an increased surface are filled with a solid polymer electrolyte layer 21 containing a conductive polymer compound. For forming the solid polymer electrolyte layer 21, a monomer fills the depressions of the aluminum support 18, and then is subjected to chemically oxidative polymerization or electrolytically oxidative polymerization.

A graphite paste layer 22 and a silver paste layer 23 (conductor layer) are successively formed on the solid polymer electrolyte layer 21 by any of screen printing, dipping, and spray coating. The solid polymer electrolyte layer 21, graphite paste layer 22, and silver paste layer 23 constitute a cathode part 28 of the capacitor device 12.

As shown in FIG. 1, the capacitor device 12 is constituted by a capacitor part 26 formed like a rectangular thin strip; and anode parts 24, each formed like a thin strip, projecting outward from side faces of longer sides of the capacitor part 26. For convenience of explanation, the direction of longer sides in the capacitor part 26 will be defined as X direction, the direction of shorter sides in the capacitor part 26 will be defined as Y direction, and a direction orthogonal to the X and Y directions will be defined as Z direction in the following.

As shown in FIG. 2, each anode part 24 is constituted by the aluminum support 18 formed with the aluminum oxide film 20. On the other hand, the capacitor part 26 has such a structure that the outer periphery of the aluminum support formed with the aluminum oxide film 20, i.e., substantially the whole area (dotted part in FIG. 1) of both sides and end faces in the X-direction, are covered with the cathode part 28 made of the solid polymer electrolyte layer 21, graphite paste layer 22, and silver paste layer 23.

A pair of anode parts 24 are formed at the side face of each longer side of the capacitor part 26, whereas each anode part extends in the Y direction. The anode parts 24 at each longer side project from respective positions corresponding to those formed at its opposing longer side. Each anode part 24 has a rectangular form extending in the extending direction (X direction) of the capacitor device 26. Insulating resin layers 27 made of an epoxy resin or silicone resin are formed at fringe areas provided with the anode parts 24 in the surface region of the capacitor part 26. The insulating resin layers 27 reliably insulate and separate the cathode part 28 provided at the capacitor part 26 from the anode parts 24.

The capacitor device 12 having the form mentioned above is shaped by punching out an aluminum foil having a roughened surface subjected to chemical processing. Therefore, the shaped aluminum foil is dipped into a chemical processing liquid, so that an aluminum oxide film is formed at an end face of the foil where aluminum is exposed. Preferred as the chemical processing liquid is an aqueous solution of ammonium adipate at a concentration of 3%, for example.

Figure 3:
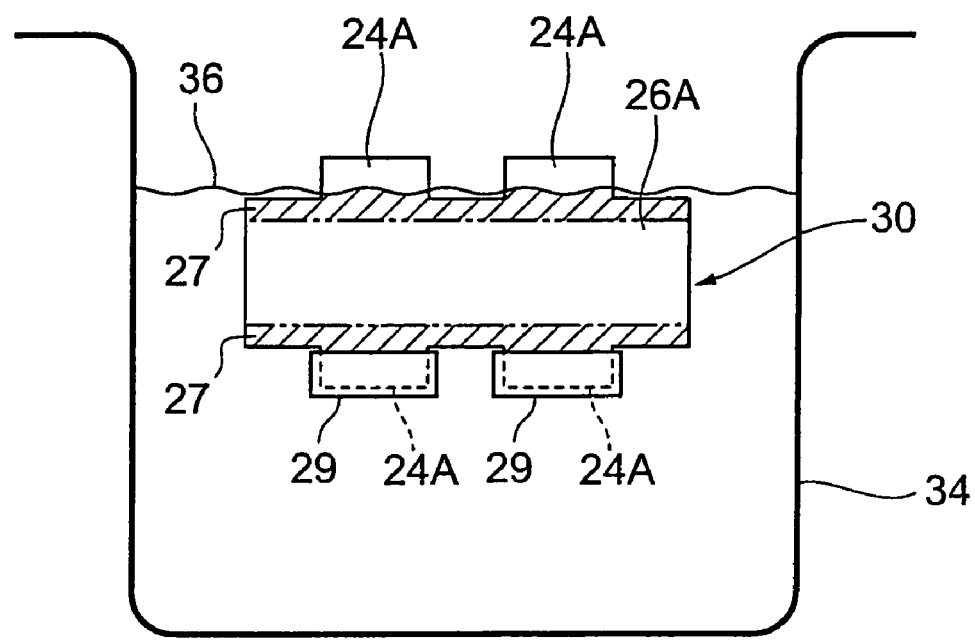
FIG. 3 is a view showing a state where an aluminum foil to become a capacitor device is subjected to anode oxidization processing.

The processing to which an aluminum foil to become the capacitor device 12 is subjected will now be explained with reference to FIG. 3. FIG. 3 is a view showing a state where an aluminum foil 30 to become the capacitor device 12 is subjected to anode oxidization processing. First, in the surface region of a part 26A to become the capacitor part 26 of the capacitor device 12, fringe areas on sides provided with parts 24A to become the anode parts 24 are formed with insulating resin layers 27. Forming the insulating resin layers 27 at predetermined areas as such reliably insulates and separates anode parts 24 and a cathode part 28, which will be formed in a later stage, from each other.

While masking the parts 24A on one side of the aluminum foil 30 with a thermosetting resist 29, and supporting the parts 24A on the other side, the aluminum foil 30 is dipped into a chemical processing solution 36 contained in a stainless beaker 34. Subsequently, a voltage is applied such that thus supported aluminum foil parts 24A and the stainless beaker 34 are set positive and negative, respectively. The applied voltage can appropriately be determined according to the thickness of the aluminum oxide film 20 to be formed, and is usually several to 20 volts when forming the aluminum oxide film 20 having a thickness of 10 nm to 1 µm.

When anode oxidization is started, the chemical processing solution 36 moves up from the liquid surface through the roughened surface of the aluminum foil 30 by capillary action. Therefore, the aluminum oxide film 20 is formed on the whole roughened surface of the aluminum foil 30 including the end faces. Thus made aluminum foil 30 is formed with the cathode part 28 by a known method, and the resist 29 is eliminated therefrom, whereby the making of the above-mentioned capacitor device 12 is completed.

Figure 4:
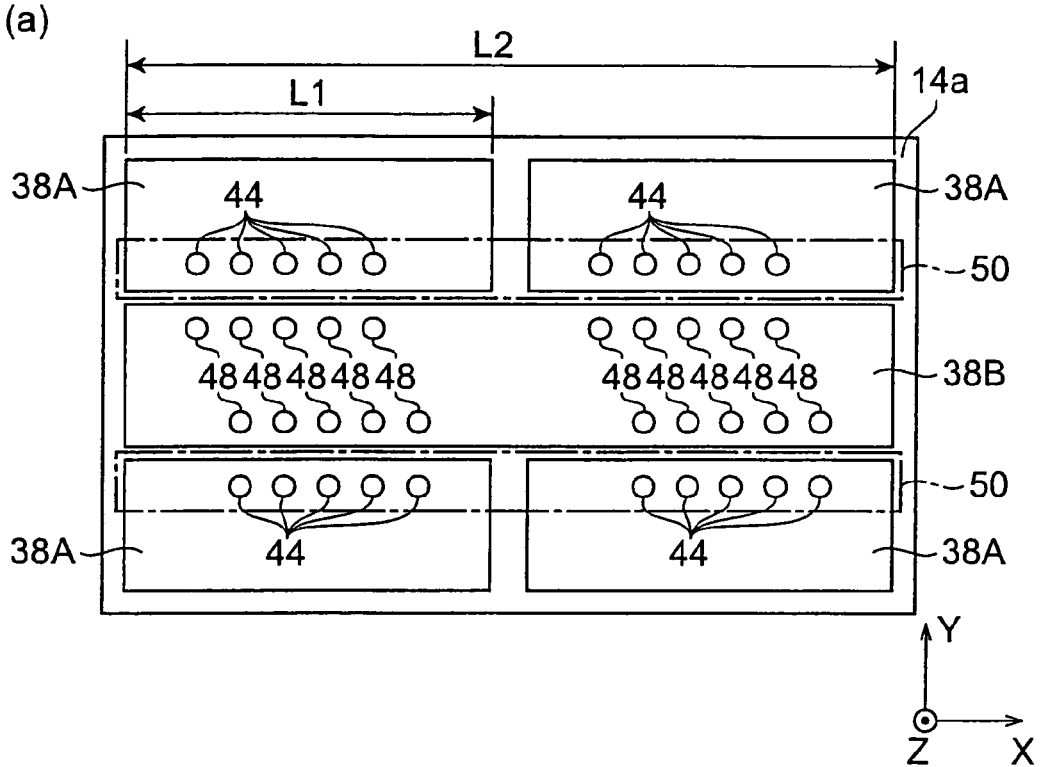
FIGS. 4A–4B illustrate a device mounting surface of a substrate and a rear face thereof.
Figure 4:
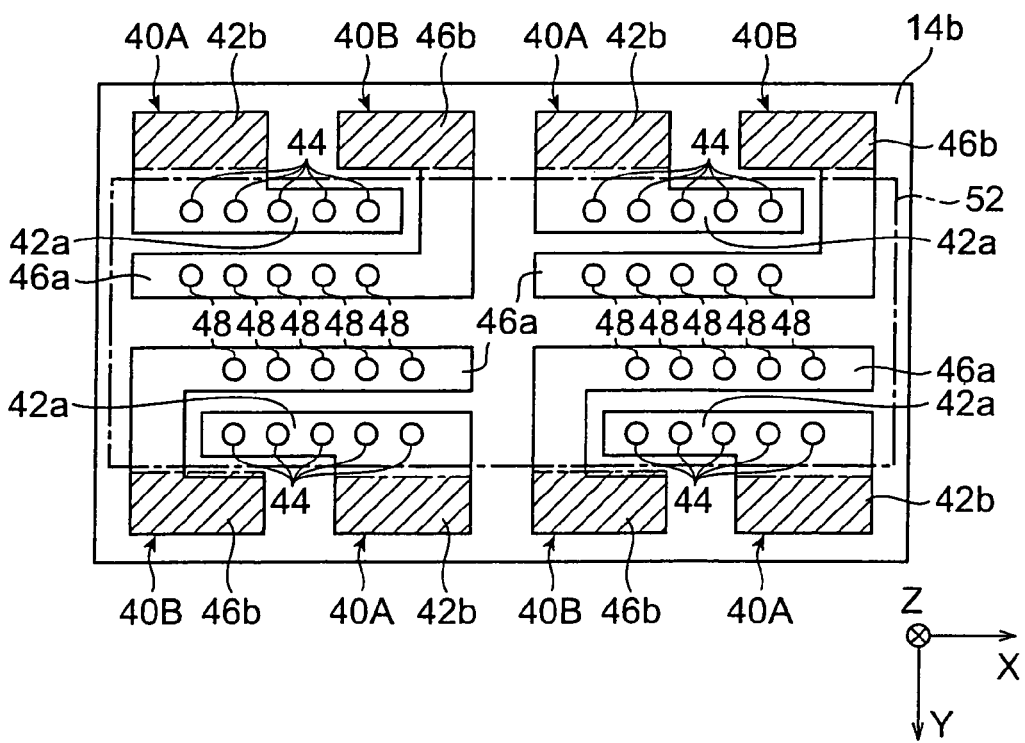

The substrate 14 on which the capacitor device 12 is mounted will now be explained with reference to FIG. 4. FIG. 4 is a view showing a device mounting surface 14a of the substrate 14 and a rear face 14b thereof, in which (a) part is a view showing the device mounting surface 14a of the substrate 14, whereas (b) part is a view showing the rear face 14b of the device mounting surface 14a of the substrate 14.

The substrate 14 is a printed board made of FR4 material (epoxy resin material) in which copper foil patterns having predetermined forms are etched on both sides 14a, 14b. The device mounting surface 14a on which the capacitor device 12 of the substrate 14 is mounted is formed with anode patterns 38A to connect with the anode parts 24 of the capacitor device 12, and a cathode electrode pattern 38B to connect with the cathode part 28 of the capacitor device 12 by way of a conductive adhesive 39. As shown in (a) part of FIG. 4, the cathode electrode pattern 38B has a rectangular form extending in the extending direction (X direction) of the rectangular substrate 14 at the center part thereof, whereas four anode electrode patterns 38A each similarly having a rectangular form extend along fringes on the longer sides of the cathode electrode pattern 38B.

The anode electrode patterns 38A are two pairs of patterns having the same form, which oppose each other across the cathode electrode pattern 38B, and are each disposed close to the cathode electrode pattern 38B. The length L1 of each anode electrode pattern 38A is about a half of the length L2 of the cathode electrode pattern 38B. The anode electrode patterns 38A positioned on the same side of the cathode electrode pattern 38B are disposed close to each other. The anode electrode patterns 38A are connected to the anode electrode parts 24 of the capacitor device 12 by resistance welding or metal welding such as YAG laser spot welding.

In each of the respective regions formed with the four anode electrode patterns 38A, 5 anode vias (conduction paths) 44 are arranged in a row along a fringe on the cathode electrode pattern 38B side. In the region formed with the cathode electrode pattern 38B, 20 cathode vias (conduction paths) 48 are formed so as to correspond to the respective anode vias 44, in rows of 5 at the respective fringes where the anode electrode patterns 38A are positioned. The anode vias 44 and cathode vias 48 are arranged in rows in the extending direction (X direction) of the anode electrode patterns 38A and cathode electrode pattern 38B, whereas each pair of corresponding anode via 44 and cathode via 48 are arranged in a row in the aligning direction (Y direction) of the anode electrode pattern 38A and cathode electrode pattern 38B while being disposed close to each other. The anode vias 44 and cathode vias 48 extend to the rear face 14b along the thickness of the substrate 14 (in the Z direction). Each of the anode vias 44 and cathode vias 48 has a circular cross section, and is formed by a circular through hole formed in the substrate 14 by drilling and copper filling the same by electroless plating.

Though not depicted in (a) part of FIG. 4, fringe areas 50 (surrounded by dash-single-dot lines in (a) part of FIG. 4) formed with the anode vias 44 in the anode electrode pattern 38A are provided with an insulating resin layer. The insulating resin layer separates and insulates the anode electrode patterns 38A from the cathode electrode pattern 38B, and is formed by coating with a material such as epoxy resin or silicone resin by a thickness of several tens of microns.

As shown in (b) part of FIG. 4, the rear face 14b of the device mounting surface 14a of the substrate 14 is formed with four pairs of anode and cathode land patterns 40A and 40B. Each anode land pattern 40A has an L form in which a rectangular pattern (outer connecting terminal part) 42b functioning as an outer connecting terminal projects from a band-like pattern 42a including end regions of the above-mentioned anode vias 44 toward a fringe region of the substrate 14. Each cathode land pattern 40B has a J form extending from a band-like pattern 46a including end regions of the above-mentioned cathode vias 48 to a rectangular pattern (outer connecting terminal part) 46b functioning as an outer connecting terminal formed at a fringe region of the substrate 14, while bypassing the anode land pattern 40A so as to keep away therefrom.

In each of the opposing fringe regions of the substrate 14, two pairs of rectangular patterns 42b and 46b of the anode land patterns 40A and 40B are arranged in a row while alternating with each other. The rectangular patterns 42b, 46b are connected to their corresponding connecting terminals on a mounting substrate (not depicted) for the electrolytic capacitor 10. Since the rectangular patterns 42b, 46b functioning as outer connecting terminals are arranged in a row while alternating with each other, universal mounting substrates can be utilized without requiring mounting substrates with specific terminal arrangements to be prepared separately. Though not depicted in (b) part of FIG. 4, a region (surrounded by a dash-single-dot line in (b) part of FIG. 4) other than the regions formed with the rectangular patterns 42b, 46b is provided with an insulating resin layer. This insulating resin layer separates and insulates the anode land patterns 40A from the cathode land patterns 40B, and is formed by coating with a material such as epoxy resin or silicone resin by a thickness of several tens of microns.

Figure 6:
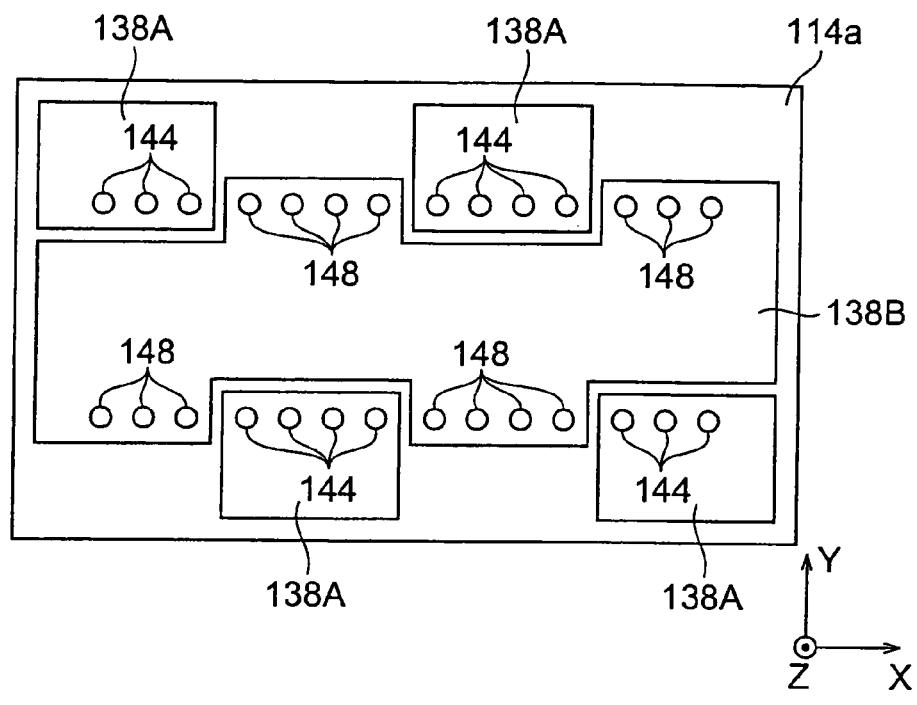
FIGS. 6A–6B illustrate a device mounting surface of a substrate under study and a rear face thereof.
Figure 6:
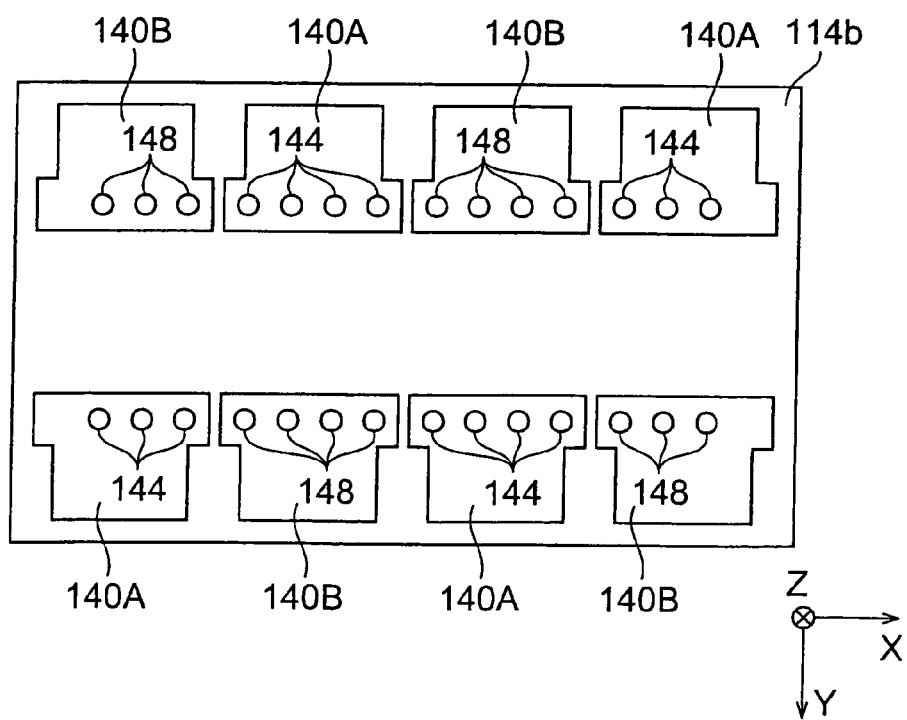

Namely, in the substrate 14, the conduction paths for connecting the cathode part 28 of the capacitor device 12 to the mounting substrate are guided to fringe regions of the substrate 14 by the wiring patterns on the rear face 14b alone. Therefore, in the substrate 14, the degree of freedom in the form acquirable by the anode electrode patterns 38A on the device mounting surface 14*a* is remarkably improved as compared with a substrate (see FIG. 6) in which the conduction paths are guided to fringe regions on both of the device mounting surface and the rear face thereof. Namely, in the substrate 14, the anode electrode patterns 38A can be formed in the whole area of the fringe regions in the device mounting surface 14*a* as shown in (a) part of FIG. 4.

Figure 5:
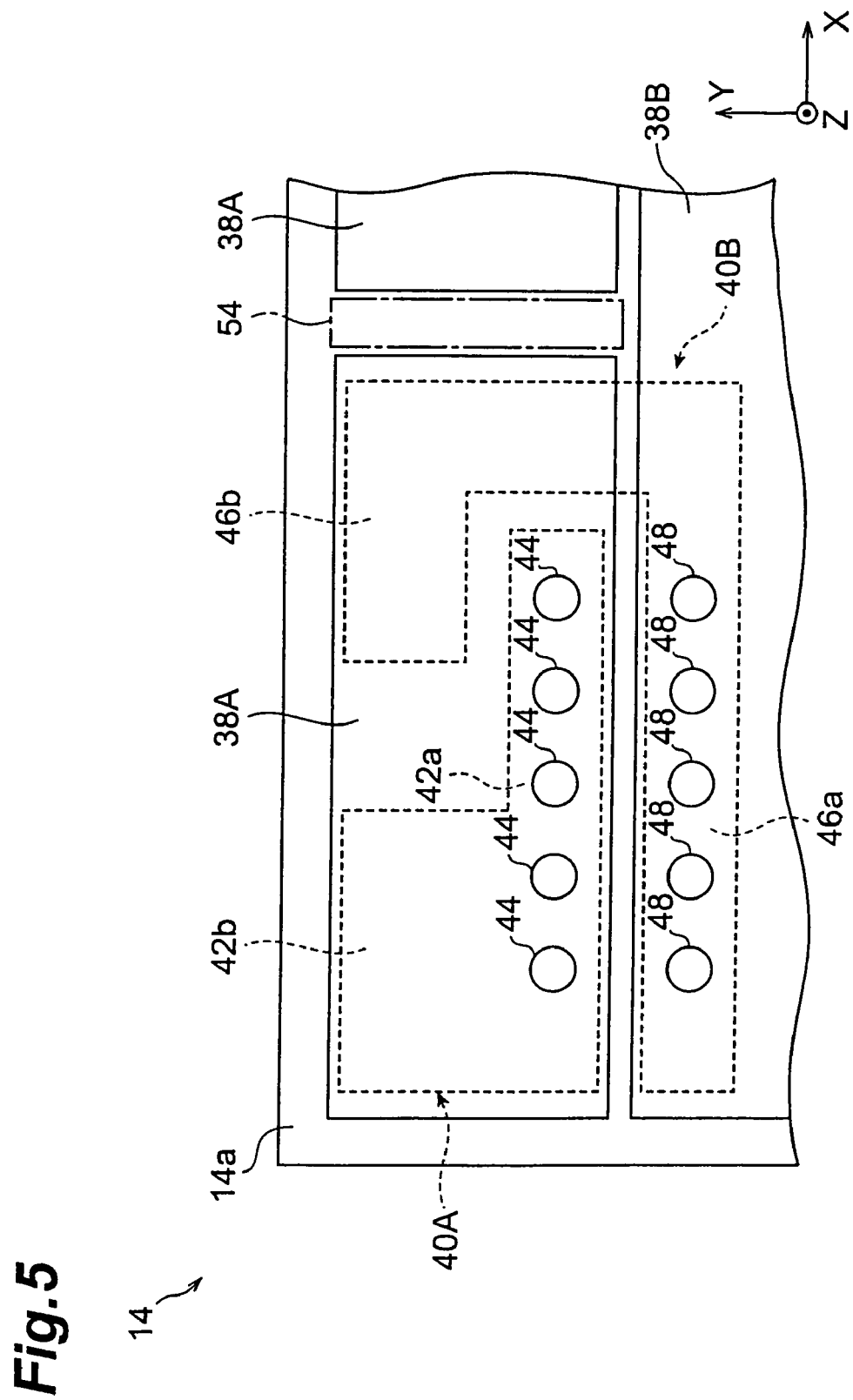
FIG. 5 is an enlarged view of a major part of the device mounting surface shown in FIG. 4.

Therefore, as shown in FIG. 5, the cathode electrode pattern 38B of the device mounting surface 14*a* can be kept from being formed in a region 54 held between the anode electrode patterns 38A, 38A adjacent each other. FIG. 5 is an enlarged view of a major part of the device mounting surface 14*a* shown in FIG. 4((*a*) part). Here, the regions formed with the anode electrode patterns 38A on the device mounting surface 14*a* include regions corresponding to the anode land patterns 40A on the rear face 14*b*, and a partial region of the cathode land patterns 40B including the rectangular patterns 46*b*.

The anode electrode patterns 38A extend so as to approach their neighboring anode electrode patterns 38A while including a part of the regions formed with the cathode land patterns 40B. When the anode electrode patterns 38A are extended in the aligning direction (X direction) of the anode vias 44 as such, a greater number of anode vias can be arranged in a row by the extension. Therefore, the substrate 14 allows a greater number of pairs of the anode and cathode vias 44 and 48 to be formed in the anode and cathode electrode patterns 38A and 38B, respectively.

In the electrolytic capacitor 10, as explained in detail in the foregoing, the regions formed with the anode electrode patterns 38A in the substrate 14, which are connected to the anode parts 24 of the capacitor device 12, include not only the regions corresponding to the anode land patterns 40A but a part of the regions corresponding to the cathode land patterns 40B. On the other hand, no cathode electrode pattern 38B is formed between the anode electrode patterns 38A adjacent each other. Therefore, the anode electrode pattern 38A is significantly greater than that in the electrolytic capacitor having the substrate shown in FIG. 6. This can facilitate the operation of connecting the capacitor device 12 to the substrate 14. It is not always necessary for the regions formed with the anode electrode patterns 38A to include the whole area corresponding to the anode land patterns 40A, but will be sufficient if they include at least a part thereof.

When the anode parts 24 of the capacitor device 12 are enlarged as the anode electrode patterns 38A are made greater, the contact area between the anode electrode patterns 38A and the anode parts 24 increases. This makes it possible to increase the number of spots of YAG laser, for example, whereby the connecting strength between the anode electrode patterns 38A and anode parts 24 can be improved significantly.

When a voltage is applied to the electrolytic capacitor 10, so that the dielectric part (aluminum oxide film) 20 stores electric charges, and when thus stored electric charges are discharged, currents flow through the anode vias 44 and cathode vias 48. Since the anode vias 44 and cathode vias 48 are formed at fringe regions where the adjacent anode electrode patterns 38A and the cathode electrode pattern 38B are disposed close to each other, a magnetic field generated by currents flowing through the anode vias 44 and a magnetic field generated by currents flowing through the cathode vias 48 strongly cancel each other out. This lowers the ESL of the electrolytic capacitor 10, thereby reducing the impedance.

Since the anode electrode patterns 38A are extended in the aligning direction (X direction) of the rectangular patterns 42*b* and 46*b* of the anode and cathode land patterns 40A and 40B in the substrate 14, a greater number of pairs of anode and cathode vias 44 and 48 are formed, whereby the electrolytic capacitor 10 exhibits a further lower ESL.

Without being restricted to the above-mentioned embodiment, the present invention can be modified in various manners. For example, the cross-sectional form of the anode and cathode vias is not limited to circular, but may be elliptical or quadrangular, for example. The number of vias may be increased or decreased as appropriate. The vias may be changed to via holes having through center parts as necessary. The capacitor is preferably an electrolytic capacitor in particular, but is not limited thereto.

What is claimed is:

1. A capacitor comprising:
   a capacitor device including anode and cathode parts; and
   a substrate including one face formed with a plurality of anode electrode patterns and a cathode electrode pattern connected to the anode and cathode parts, respectively, and the other face formed with anode and cathode land patterns connected to the anode and cathode electrode patterns corresponding thereto by way of conduction paths extending along a thickness direction;
   wherein the anode electrode pattern is integrally formed with a region including at least a part of a region corresponding to the anode land pattern and at least a part of a region corresponding to the cathode land pattern in an area of the one face of the substrate.

2. A capacitor according to claim 1, wherein respective outer connecting terminal parts of the anode and cathode land patterns connected to connecting terminals of a mounting substrate are arranged in a row while alternating with each other.

3. A capacitor according to claim 2, wherein the region formed with the anode electrode pattern is provided with a plurality of the conduction paths arranged in an arranging direction of the anode and cathode land patterns; and wherein a region formed with the cathode electrode pattern is provided with a plurality of the conduction paths adjacent to the conduction paths formed in the anode electrode pattern.

4. A capacitor comprising:
   a capacitor device including a plurality of anode parts and a cathode part; and
   a substrate including one face formed with a plurality of anode electrode patterns connected to the respective anode parts and a cathode electrode pattern connected to the cathode part, and a plurality of conduction paths respectively extending from the anode electrode patterns and cathode electrode pattern formed on the one face to the other face along a thickness direction;
   wherein the plurality of the anode electrode patterns are arranged in a row on at least one side of the cathode electrode pattern with no cathode electrode pattern formed in a region held between the anode electrode patterns arranged in a row.

5. A capacitor according to claim 4, wherein the other face of the substrate is formed with an anode land pattern connected to the anode electrode pattern by way of the conduction path and a cathode land pattern connected to the cathode electrode pattern by way of the conduction path; and wherein respective outer connecting terminal parts of the anode and cathode land patterns connected to connecting terminals of a mounting substrate are arranged in a row while alternating with each other.

6. A capacitor according to claim 5, wherein a region formed with the anode electrode pattern is provided with a plurality of the conduction paths arranged in an arranging direction of the anode and cathode land patterns; and wherein a region formed with the cathode electrode pattern is provided with a plurality of the conduction paths adjacent to the conduction paths formed in the anode electrode pattern.

* * * * *